US007225609B2

(12) United States Patent
Takubo

(10) Patent No.: US 7,225,609 B2
(45) Date of Patent: Jun. 5, 2007

(54) CONTROL APPARATUS FOR INTERNAL COMBUSTION ENGINE

(75) Inventor: Hideki Takubo, Tokyo (JP)

(73) Assignee: Mitsubishi Denki Kabushiki Kaisha, Tokyo (JP)

( * ) Notice: Subject to any disclaimer, the term of this patent is extended or adjusted under 35 U.S.C. 154(b) by 0 days.

(21) Appl. No.: 11/330,147

(22) Filed: Jan. 12, 2006

(65) Prior Publication Data

US 2007/0033926 A1 Feb. 15, 2007

(30) Foreign Application Priority Data

Aug. 9, 2005 (JP) ............................. 2005-230921

(51) Int. Cl.
*F01N 3/00* (2006.01)
(52) U.S. Cl. .............................. 60/285; 60/276; 60/277
(58) Field of Classification Search .................. 60/274, 60/276, 277, 285; 701/103, 109, 112
See application file for complete search history.

(56) References Cited

U.S. PATENT DOCUMENTS

| 5,740,676 | A * | 4/1998 | Agustin et al. ................ 60/276 |
| 6,253,541 | B1 * | 7/2001 | Sullivan et al. ............... 60/274 |
| 6,253,542 | B1 * | 7/2001 | Omara et al. ................. 60/274 |
| 6,256,981 | B1 * | 7/2001 | Sullivan et al. ............... 60/274 |
| 6,463,735 | B2 * | 10/2002 | Morinaga et al. ............. 60/277 |
| 6,513,321 | B2 * | 2/2003 | Suzuki et al. ................. 60/285 |
| 6,622,478 | B2 * | 9/2003 | Nakamura .................... 60/285 |
| 6,915,628 | B2 * | 7/2005 | Kamoto et al. ............... 60/277 |
| 7,000,379 | B2 * | 2/2006 | Makki et al. ................. 60/285 |

FOREIGN PATENT DOCUMENTS

JP 6-42387 A 2/1994

* cited by examiner

*Primary Examiner*—Thomas Denion
*Assistant Examiner*—Diem Tran
(74) *Attorney, Agent, or Firm*—Sughrue Mion, PLLC

(57) ABSTRACT

A control apparatus for an internal combustion engine, which makes it possible to ensure quick recovery of a storage amount of oxygen saturated due to a fuel cut, to restore the capacity of a catalytic converter to absorb air-fuel ratio disturbances, and to suppress torque fluctuations through prevention of overcorrection of the air-fuel ratio during normal operation. The control apparatus for an internal combustion engine according to the present invention is equipped with a proportional gain changeover unit. This unit makes a changeover in a proportional gain for proportional calculation in a downstream-side control unit for a predetermined period from a normal proportional gain to a post-fuel-cut proportional gain set larger than the normal proportional gain by a predetermined value, when a fuel cutoff unit starts cutting the fuel supply.

6 Claims, 12 Drawing Sheets

CONTROL APPARATUS FOR INTERNAL COMBUSTION ENGINE

BACKGROUND OF THE INVENTION

1. Field of the Invention

The present invention relates to a control apparatus for an internal combustion engine.

2. Description of the Related Art

In present-day automobiles, a three-way catalytic is installed in an exhaust passage of an internal combustion engine to purify the exhaust gas. As is well known, the three-way catalytic exhibits a high purification ratio for any one of HC, CO, and NOx in the neighborhood of the stoichiometric air-fuel ratio, so air-fuel ratio control is performed with oxygen concentration sensors provided upstream and downstream of the catalytic so that the atmosphere of the catalytic is maintained in the neighborhood of the stoichiometric air-fuel ratio.

The air-fuel ratio upstream of a catalytic converter is controlled to a value in the neighborhood of the stoichiometric air-fuel ratio using the oxygen concentration sensor provided upstream of the catalytic converter. However, the oxygen concentration sensor provided upstream of the catalytic converter is exposed to a high-temperature exhaust gas, causing output fluctuations, so the oxygen concentration sensor provided downstream of the catalytic converter is used to correct errors.

The amplitude of fluctuations in the output from the oxygen concentration sensor provided downstream of the catalytic converter is small because the atmosphere exhaust gas temperature is low. Moreover, the exhaust gas has been sufficiently mixed and the air-fuel ratio is close to its equilibrium state in a region downstream of the catalytic, so it is possible to detect a purification state of the catalytic accurately and stably.

Therefore, as long as the air-fuel ratio downstream of the catalytic converter is maintained in the neighborhood of the stoichiometric air-fuel ratio, it is possible to maintain a good purification state of the catalytic.

Thus, there is already well known a method for adjusting the air-fuel ratio upstream of the catalytic converter through proportional calculation and integral calculation, which are performed on the basis of a difference in the air-fuel ratio downstream of the catalytic converter from the stoichiometric air-fuel ratio, using a control system for maintaining the air-fuel ratio downstream of the catalytic converter at a value in the neighborhood of the stoichiometric air-fuel ratio.

Integral calculation, which is designed to generate an output through integration of a difference and thus exhibits relatively low responsiveness, can eliminate a steady difference in the air-fuel ratio downstream of the catalytic converter resulting from fluctuations in the output from the upstream oxygen concentration sensor.

Proportional calculation, which is designed to generate an output in proportion to a difference and thus exhibits high responsiveness, achieves the effect of ensuring quick recovery of a temporary difference in the air-fuel ratio downstream of the catalytic converter resulting from disturbances in the air-fuel ratio upstream of the catalytic converter. The speed of recovery increases in accordance with an increase in proportional gain.

An internal combustion engine repeatedly accelerates and decelerates, and the air-fuel ratio upstream of the catalytic converter fluctuates temporarily. The catalytic is endowed with an oxygen storage capacity with a view to absorbing a temporary deviation in the air-fuel ratio from the stoichiometric air-fuel ratio. The oxygen storage capacity is created by adding a substance having such oxygen storage capacity to the catalytic. The upper limit of the oxygen storage amount in the catalytic is determined by setting the amount of the substance.

The catalytic takes in oxygen in the exhaust gas on the lean side with respect to the stoichiometric air-fuel ratio, and maintains the air-fuel ratio of the atmosphere in the catalytic converter at a value in the neighborhood of the stoichiometric air-fuel ratio until the oxygen storage amount reaches its upper limit.

The catalytic discharges the oxygen retained thereby on the rich side with respect to the stoichiometric air-fuel ratio, and maintains the air-fuel ratio of the atmosphere in the catalytic converter at a value in the neighborhood of the stoichiometric air-fuel ratio until the oxygen amount reaches it's minimum value "0" is stopped.

The capacity to absorb fluctuations in the air-fuel ratio upstream of the catalytic converter to the lean or rich side is maximized when the oxygen storage amount of the catalytic is about half of its upper limit, so a drop in the exhaust gas purification ratio of the catalytic is minimized.

Since the oxygen storage amount of this catalytic is detectable from a minor change in the air-fuel ratio downstream of the catalytic converter in the neighborhood of the stoichiometric air-fuel ratio, air-fuel ratio control based on an output from the oxygen concentration sensor provided downstream of the catalytic converter is performed to ensure that the oxygen storage amount is maintained in a suitable state, namely, at about half of its upper limit (e.g., see JP 06-42387 A).

The invention in the conventional art is designed as described above and therefore has the following problems. The oxygen storage amount rises to its upper limit to be saturated, and the capacity to absorb disturbances to the lean side is minimized when the air-fuel ratio upstream of the catalytic converter becomes considerably lean and the mixture gas becomes almost as thin as the atmosphere due to the fuel cut. Therefore, after the fuel cut, it is desirable to recover the oxygen storage amount to the suitable state, that is, about half of its upper limit as soon as possible and restore the capacity to absorb disturbances in the air-fuel ratio.

In this case, the speed of recovery can be increased when the proportional gain in air-fuel ratio control based on the air-fuel ratio output from the oxygen concentration sensor provided downstream of the catalytic converter in PI (Proportion, Integral) control is set large.

However, if the proportional gain is set large, the amount of fuel supplied to the internal combustion engine significantly changes due to a change in the output from the oxygen concentration sensor provided downstream of the catalytic converter during normal operation in which the fuel supply is not cut, thus causing excessive torque fluctuations to deteriorate the marketability of the internal combustion engine to be controlled. As a result, there arises a problem in that the proportional gain cannot be set large.

SUMMARY OF THE INVENTION

The present invention has been made to solve the problem described above, and an object of the present invention is therefore to provide a control apparatus for an internal combustion engine which is designed to make a changeover between a normal proportional gain and a post-fuel-cut proportional gain set larger than the normal proportional gain, to thereby ensure quick recovery of the storage amount of oxygen saturated due to the fuel cut, restore the capacity of the catalytic to absorb air-fuel ratio disturbances, and suppress torque fluctuations through prevention of overcorrection of the air-fuel ratio during normal operation.

A control apparatus for an internal combustion engine according to the present invention includes: an exhaust system of the internal combustion engine; a catalytic converter disposed in the exhaust system, for purifying an exhaust gas; upstream-side air-fuel ratio detecting means for detecting an air-fuel ratio upstream of the catalytic converter; downstream-side air-fuel ratio detecting means for detecting an air-fuel ratio in the exhaust gas downstream of the catalytic converter; air-fuel ratio adjusting means for adjusting the air-fuel ratio through adjustment of an amount of fuel supplied to the internal combustion engine; downstream-side target air-fuel ratio storing means for storing and retaining a target value for the air-fuel ratio downstream of the catalytic converter; downstream-side control means for calculating an upstream-side target air-fuel ratio through proportional calculation so that the downstream-side air-fuel ratio detected by the downstream-side air-fuel ratio detecting means coincides with the downstream-side target air-fuel ratio stored and retained by the downstream-side target air-fuel ratio storing means; upstream-side control means for controlling the air-fuel ratio adjusting means so that the upstream-side air-fuel ratio detected by the upstream-side air-fuel ratio detecting means coincides with the upstream-side target air-fuel ratio calculated by the downstream-side control means; fuel supply cut means for cutting the fuel supply performed by the air-fuel ratio adjusting means; and proportional gain changeover means for making a changeover in a proportional gain for proportional calculation in the downstream-side control means for a predetermined period from a normal proportional gain to a post-fuel-cut proportional gain set larger than the normal proportional gain by a predetermined value, when the fuel supply cut means starts cutting the fuel supply. By thus making a changeover between a normal proportional gain and a post-fuel-cut proportional gain set larger than the normal proportional gain, it becomes possible to ensure quick recovery of the storage amount of oxygen saturated due to the fuel cut, restore the capacity of the catalytic to absorb air-fuel ratio disturbances, and suppress torque fluctuations through prevention of overcorrection of the air-fuel ratio during normal operation.

DETAILED DESCRIPTION OF THE PREFERRED EMBODIMENTS

First Embodiment

A control apparatus for an internal combustion engine according to a first embodiment of the present invention will be described hereinafter with reference to the drawings.

Figure 1:
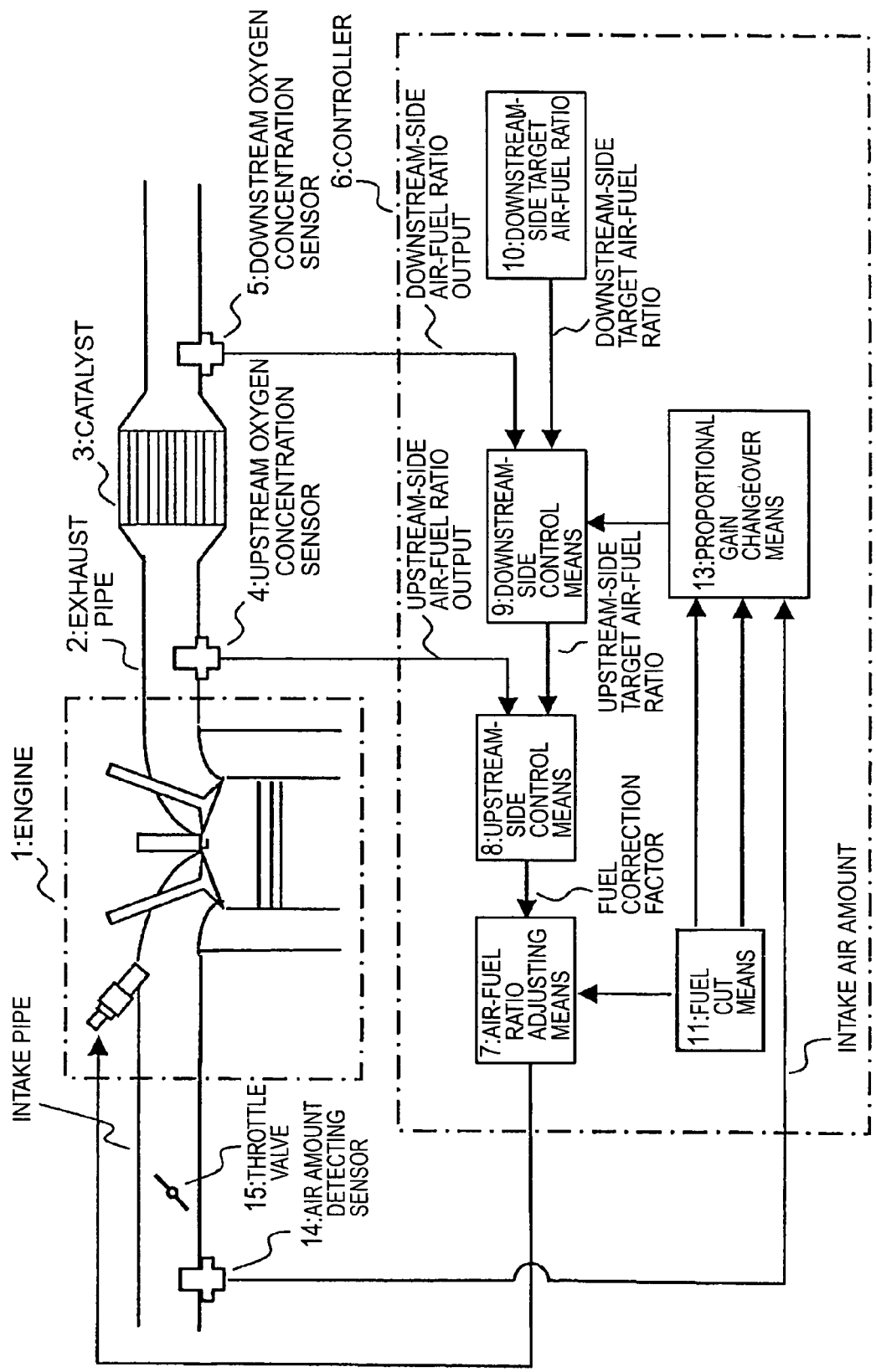
FIG. 1 is a diagram showing a configuration of a control apparatus for an internal combustion engine according to a first embodiment of the present invention.

FIG. 1 is a diagram showing a configuration of the control apparatus for an internal combustion engine according to the first embodiment of the present invention.

As shown in FIG. 1, the control apparatus for an internal combustion engine controls an air-fuel ratio, that is, the ratio between air and fuel (air/fuel) supplied to an engine 1 as the internal combustion engine.

Disposed in an exhaust pipe 2 of the engine 1 is a catalytic converter 3 for simultaneously purifying poisonous components HC, CO, and NOx in the exhaust gas discharged from the engine 1.

An upstream oxygen concentration sensor 4 is an $O_2$ sensor for detecting the concentration of oxygen in the exhaust gas upstream of the catalytic converter 3, and a downstream oxygen concentration sensor 5 is an $O_2$ sensor for detecting the concentration of oxygen in the exhaust gas downstream of the catalytic converter 3. Oxygen is a specific component contained in the exhaust gas.

The upstream oxygen concentration sensor 4 and the downstream oxygen concentration sensor 5 each generate electric signals corresponding to the concentrations of oxygen in the exhaust gas upstream and downstream of the catalytic. In other words, the output voltages generated by those sensors differ depending on whether the air-fuel ratio in the exhaust gas is on the lean side or on the rich side with respect to the stoichiometric air-fuel ratio.

The detected oxygen concentrations are used as information for specifying the air-fuel ratio within the exhaust pipe 2. More specifically, the control apparatus for the internal combustion engine is equipped with a controller 6 for controlling the air-fuel ratio of fuel supplied to the engine 1, and the controller 6 controls the air-fuel ratio of fuel supplied to the engine 1 based on the oxygen concentrations detected by the upstream oxygen concentration sensor 4 and downstream oxygen concentration sensor 5.

The outputs from the upstream oxygen concentration sensor 4 and downstream oxygen concentration sensor 5 are voltage values corresponding to the detected oxygen concentrations.

The controller 6 stores and retains later-described output characteristics between voltage value and air-fuel ratio shown in FIG. 2 or FIG. 3. In some cases, the controller 6 performs air-fuel ratio control by converting the voltage value outputted from the upstream oxygen concentration sensor 4 or downstream oxygen concentration sensor 5 according to the aforementioned characteristics. In other cases, the controller 6 does not have such output characteristics and performs air-fuel ratio control through direct use of a voltage value.

The controller 6 is composed of a microprocessor, a ROM, a RAM, an I/O interface, and the like.

The controller 6 is equipped with air-fuel ratio adjusting means 7, upstream-side control means 8, downstream-side control means 9, downstream-side target air-fuel ratio storing means 10, fuel cut means 11, and proportional gain changeover means 13.

The air-fuel ratio adjusting means 7 controls an air-fuel ratio by adjusting the amount of fuel supplied to the engine 1.

The upstream-side control means 8 has a PI (Proportion, Integral) controller for controlling the output to the air-fuel ratio adjusting means 7 through proportional and integral calculations so that an upstream-side air-fuel ratio output detected by the upstream oxygen concentration sensor 4 coincides with an upstream-side target air-fuel ratio.

The downstream-side control means 9 has a PI controller for calculating and controlling the upstream-side target air-fuel ratio through proportional and integral calculations so that a downstream-side air-fuel ratio output detected by the downstream oxygen concentration sensor 5 coincides with a downstream-side target air-fuel ratio corresponding to the stoichiometric air-fuel ratio.

The downstream-side target air-fuel ratio storing means 10, which is constructed as a ROM, stores and retains a target value for the air-fuel ratio in the exhaust gas downstream of the catalytic converter 3.

The fuel cut means 11 cuts the fuel supply by the air-fuel ratio adjusting means 7.

The proportional gain changeover means 13 changes a proportional gain for proportional calculation of the downstream-side control means from a normal proportional gain to a post-fuel-cut proportional gain that is set larger than the normal proportional gain by a predetermined value, as soon as the fuel cut means 11 starts cutting the fuel supply. The proportional gain changeover means 13 makes a changeover from the post-fuel-cut gain to the normal gain as soon as an integrated air amount sucked into the internal combustion engine, namely, an integrated air amount detected by an air amount sensor 14 reaches a predetermined criterial air amount after the cancellation of the fuel cut.

The post-fuel-cut proportional gain, which is set larger than the normal proportional gain by the predetermined value, assumes such a value as allows quick recovery of a storage amount of oxygen saturated due to the fuel cut and restoration of the capacity of the catalytic to absorb air-fuel ratio disturbances, but performs overcorrection of the air-fuel ratio during normal operation to cause torque fluctuations. The post-fuel-cut proportional gain is sufficiently larger than the normal proportional gain.

Next, the operation thereof will be described.

Figure 2:
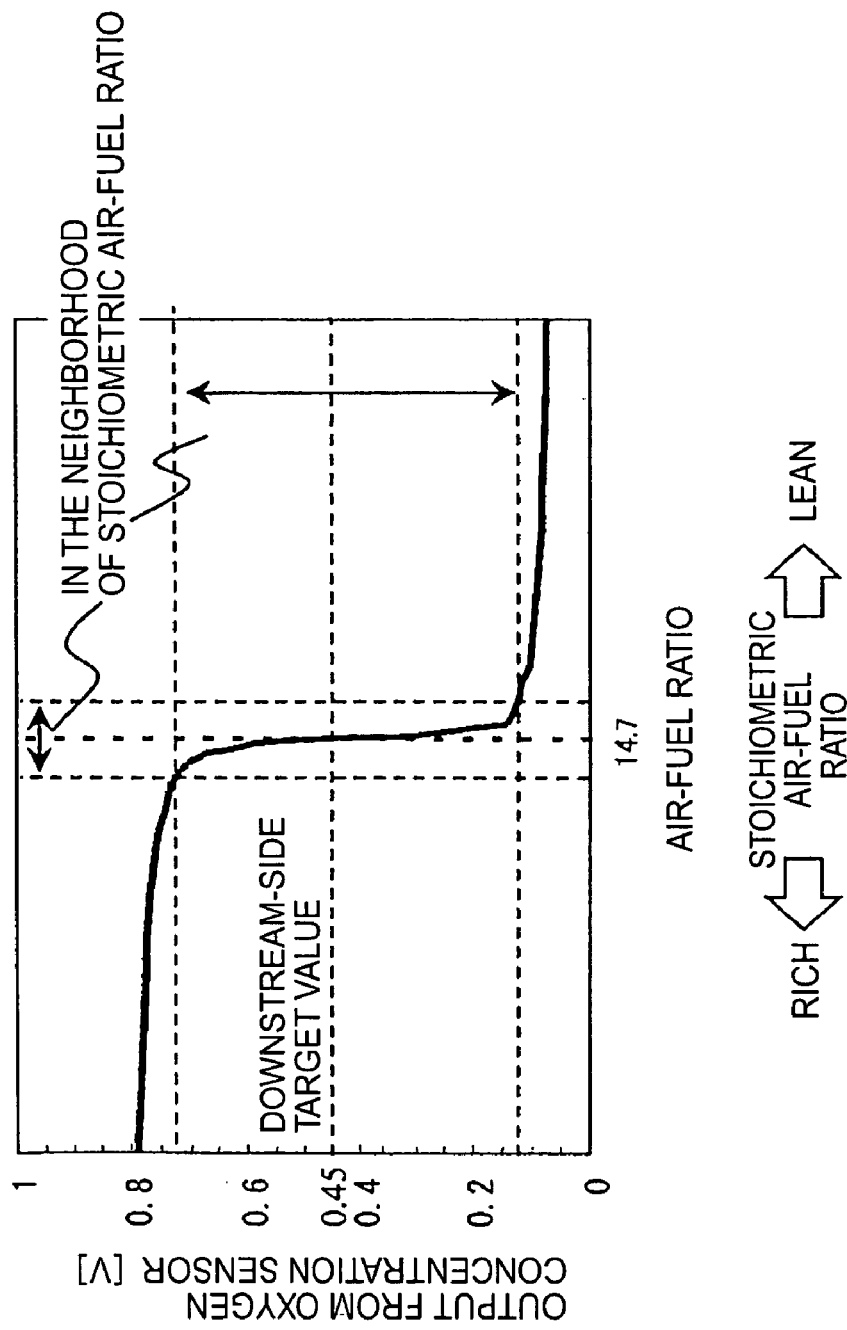
FIG. 2 is a diagram showing output characteristics of an oxygen concentration sensor having λ-type output characteristics for air-fuel ratio, that is, characteristics corresponding to the stoichiometric air-fuel ratio.

FIG. 2 is a diagram showing output characteristics of an oxygen concentration sensor having λ-type output characteristics for air-fuel ratio, that is, characteristics corresponding to the stoichiometric air-fuel ratio.

An air-fuel ratio output from the downstream oxygen concentration sensor 5 is transmitted to the controller 6. Used as the downstream oxygen concentration sensor 5 is a λ-type sensor having such binary characteristics that the output voltage abruptly changes in the neighborhood of the stoichiometric air-fuel ratio in the course of changes in the air-fuel ratio of the sensor atmosphere shown in FIG. 2.

This λ-type sensor exhibits a very high detecting resolution in the neighborhood of the stoichiometric air-fuel ratio, thus contributing to the enhancement of control accuracy.

An output from the downstream oxygen concentration sensor 5 is transmitted as a downstream-side air-fuel ratio output to the downstream-side control means 9.

As described above, the controller 6 may or may not have the characteristics of the air-fuel ratio for the output voltage of the downstream oxygen concentration sensor 5 shown in FIG. 2. The following description handles a case where the controller 6 performs control processing through direct use of a voltage value. Therefore, in the following description, the downstream-side air-fuel ratio output indicates a voltage value.

It is assumed here that the voltage value corresponding to the downstream-side target air-fuel ratio is 0.45 (V) in the output characteristics shown in FIG. 2.

The downstream-side target air-fuel ratio is set in the neighborhood of 0.45 (V), that is, a predetermined output value of the λ-type oxygen concentration sensor as a value corresponding to the stoichiometric air-fuel ratio, and is transmitted to the downstream-side control means 9.

In the downstream-side control means 9, a difference $\Delta Vr$ between the downstream-side target air-fuel ratio and the downstream-side air-fuel ratio output is calculated as expressed by the following equation (1). The PI controller for performing proportional calculation. (hereinafter referred to as "P") and integral calculation (hereinafter referred to as "I") according to the difference $\Delta Vr$ controls the output so that the difference $\Delta Vr$ is eliminated. This output is transmitted as an upstream-side target air-fuel ratio to the upstream-side control means 8.

$$\Delta Vr = \text{downstream-side target air-fuel ratio} - \text{downstream-side air-fuel ratio output} \quad (1)$$

The usual standard PI controller in the downstream-side control means 9 calculates an upstream-side target air-fuel ratio AFOBJF as expressed by equation (2).

$$AFOBJF = \text{center value} - \Sigma(Kir \times \Delta Vr) - Kpr \times \Delta Vr \quad (2)$$

It should be noted here that Kir denotes an integral gain, and that Kpr denotes a proportional gain. The center value, which corresponds to the stoichiometric air-fuel ratio, is set to 14.7 in this case.

As described above, integral calculation, which generates an output through integration of a difference and thus operates relatively slowly, achieves an effect of slowly eliminating a steady difference in the air-fuel ratio downstream of the catalytic converter 3 resulting from fluctuations in the output from the upstream oxygen concentration sensor 4. In other words, integral calculation compensates for a deviation in the center value caused due to the fluctuations in the output from the upstream oxygen concentration sensor 4. The term "center value–$\Sigma(Kir \times \Delta Vr)$" in the equation (2) corresponds to a post-compensation stoichiometric air-fuel ratio.

On the other hand, proportional calculation, which generates an output in proportion to a difference and thus exhibits high responsiveness, achieves an effect of promptly recovering the difference. Therefore, as the proportional gain Kpr is increased, an operation amount "$Kpr \times \Delta Vr$" increases and the speed of recovery increases as well.

In the characteristics shown in FIG. 2, for example, the upstream-side target air-fuel ratio is set on the rich side with respect to the stoichiometric air-fuel ratio so as to ensure recovery to the downstream-side target air-fuel ratio when the downstream-side air-fuel ratio output is smaller than the downstream-side target air-fuel ratio (0.45(V)) (when the downstream-side air-fuel ratio output is on the lean side).

In the control apparatus for an internal combustion engine according to the first embodiment, attention is paid to the behavior within a short period before and after the fuel cut. An integrally calculated value does not change for that short period as drastically as a proportionally calculated value. Therefore, the following description deals with the behavior of the proportionally calculated value using the proportional gain, with the behavior of the integrally calculated value using the integral gain being omitted.

Figure 3:
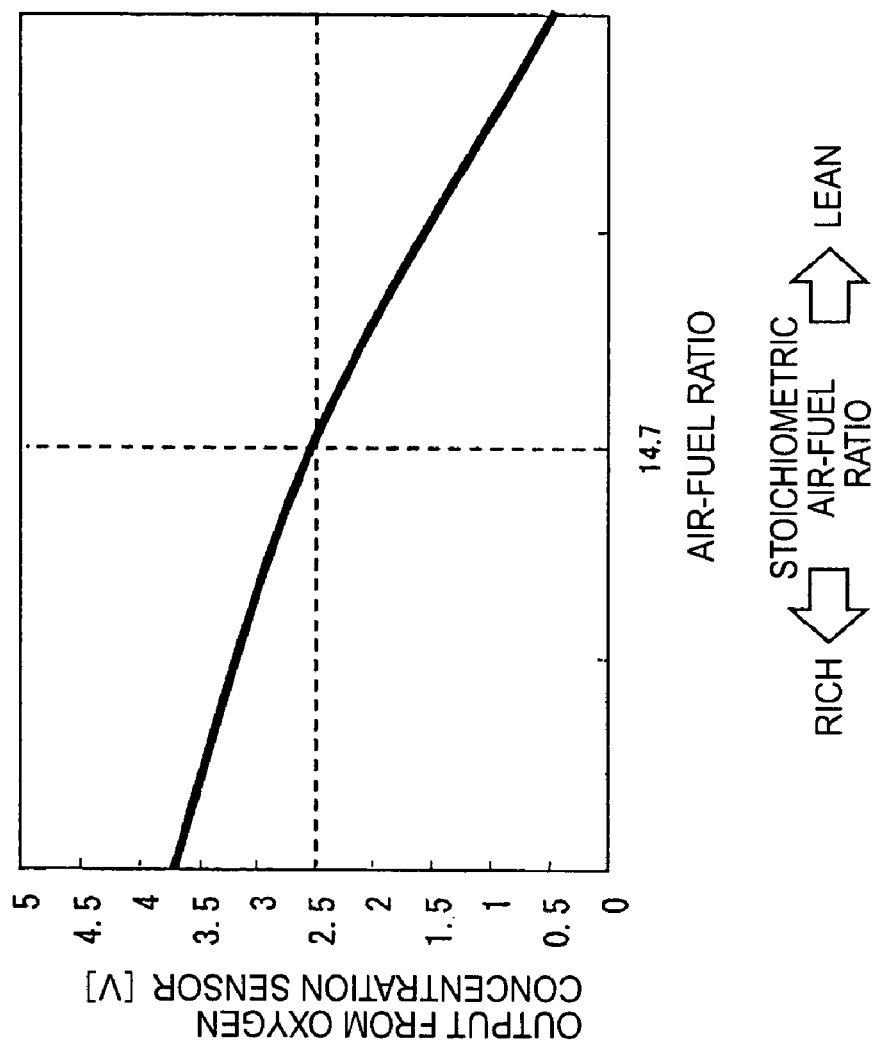
FIG. 3 is a characteristic diagram showing output characteristics of an upstream oxygen concentration sensor having a linear characteristic for oxygen concentration.

FIG. 3 is a characteristic diagram showing output characteristics of an upstream oxygen concentration sensor having linear characteristics for oxygen concentration.

An output (air-fuel ratio output) from the upstream oxygen concentration sensor 4 is transmitted to the controller 6.

As shown in FIG. 3, the upstream oxygen concentration sensor 4 has linear output characteristics for changes in the air-fuel ratio of the sensor atmosphere. An output from the upstream oxygen concentration sensor 4 is transmitted as an upstream-side air-fuel ratio output to the upstream-side control means 8.

As is the case with the output from the downstream oxygen concentration sensor 5, an output as a voltage may be directly transmitted to the controller 6 to perform control processing. Alternatively, it is also appropriate to store sensor characteristics shown in FIG. 3 into the controller 6 in advance and perform control processings after converting an output voltage into an air-fuel ratio.

The subsequent description handles a case where the processing is performed after converting the output voltage into the air-fuel ratio. Therefore, the upstream-side air-fuel ratio output does not indicate a voltage value but a post-conversion upstream-side air-fuel ratio.

In the upstream-side control means 8, a difference $\Delta AFf$ between the upstream-side target air-fuel ratio and the upstream-side air-fuel ratio output is calculated as expressed by equation (3). The PI controller for performing proportional and integral calculations according to the difference $\Delta AFf$ calculates an output serving to eliminate the difference $\Delta AFf$ as expressed by equation (4). This output is transmitted as a fuel correction factor Cfb to the air-fuel ratio adjusting means 7.

$$\Delta AFt = \text{upstream-side target air-fuel ratio} - \text{upstream-side air-fuel ratio output} \quad (3)$$

$$Cfb = 1.0 + \Sigma(Kif \times \Delta AFf) + Kpf \times \Delta AFf \quad (4)$$

It should be noted here that Kif denotes an integral gain and that Kpf denotes a proportional gain.

In the air-fuel ratio adjusting means 7, a fuel supply amount Qfuel supplied to the engine 1 is adjusted according to the fuel correction factor Cfb as expressed by equation (5), to thereby controlling the air-fuel ratio of the engine 1.

$$Q\text{fuel} = Q\text{fuel0} \times Cfb \quad (5)$$

It should be noted here that Qfuel0 denotes a base fuel supply amount, which is calculated as expressed by equation (6).

$$Q\text{fuel0} = Q\text{acyl}/\text{stoichiometric air-fuel ratio} \quad (6)$$

It should be noted here that Qacyl denotes an amount of air supplied to the engine 1 calculated based on an intake air amount qa detected by the air amount detecting sensor 14.

The base fuel supply amount Qfuel0 may be calculated in a feed-forward manner using the upstream-side target air-fuel ratio, as expressed by equation (7).

$$Q\text{fuel0} = Q\text{acyl}/\text{upstream-side target air-fuel ratio} \quad (7)$$

<Oxygen Storage Behavior and Changeover Timing>

The most appropriate time for making a changeover in the proportional gain is a time when the oxygen storage amount has recovered to a suitable state, that is, about half of its upper limit. The changeover in the proportional gain must conform to the recovery behavior of the oxygen storage amount.

The behavior of the oxygen storage amount can be calculated from equation (8) and inequality (9).

$$OSC = \Sigma(\Delta A/F \times KO2 \times qa \times \Delta T) \quad (8)$$

$$0 \leq OSC \leq \text{upper limit} \quad (9)$$

The oxygen storage amount OSC can be relatively accurately calculated by integrating a value obtained by multiplying a difference $\Delta A/F$ in the air-fuel ratio upstream of the catalytic converter 3 from the stoichiometric air-fuel ratio, a predetermined factor KO2 for converting the air-fuel ratio into the oxygen concentration, an amount qa of air sucked into the internal combustion engine, and a calculation cycle $\Delta T$ by one another. Since $\Delta T$ and KO2 are set to predetermined values, the behavior of OSC depends on changes in $\Delta A/F$ and qa.

Since the oxygen storage amount has its upper limit as described above, it is confined by the upper limit and a minimum value "0" as expressed by the inequality (9).

The difference $\Delta A/F$ in the equation (8) corresponds to an operation amount "$Kpr \times \Delta Vr$" from the stoichiometric air-fuel ratio in the equation (2). The larger the proportional gain Kpr is set, the larger the difference $\Delta A/F$ becomes and the higher the recovery speed of the oxygen storage amount becomes.

The operation amount "$Kpr \times \Delta Vr$" corresponding to the difference $\Delta Vr$ in the equation (2) or the difference $\Delta A/F$ in the equation (8) also assumes a certain value when the difference $\Delta Vr$ in the downstream-side air-fuel ratio output in the equation (1) assumes a certain value on the way of recovery from the storage amount of saturated oxygen due to the fuel cut.

It is apparent from the equation (8) that the speed of change in the oxygen storage amount changes in proportion to the intake air amount qa even if the difference $\Delta A/F$ is same. The speed of recovery is proportional to the intake air amount, and the amount of recovery is proportional to the integrated value of the intake air amount.

Thus, the period up to the recovery of the storage amount of saturated oxygen is equal to the period until the integrated value of the intake air amount becomes equal to a predetermined value.

Due to a change in the opening degree of a throttle valve 15, the intake air amount qa drastically changes from 4 g/s to about 70 g/s, that is, becomes 10 or more times as large as before. Owing to a change in the intake air amount, the period until the integrated value of the intake air amount reaches the predetermined value drastically changes. Therefore, the deviation in the time for a changeover in the proportional gain becomes too large to ignore.

<Operation of Air-Fuel Ratio Control In View Of Oxygen Storage Capacity>

The fuel cut means 11 sets the fuel amount Qfuel set in the air-fuel ratio adjusting means 7 to "0" and cuts the fuel supply when a predetermined driving condition, for example, the condition in which the throttle valve 15 is closed to its minimum opening degree for deceleration, is fulfilled.

Information on the performance of fuel supply cut is transmitted to the proportional gain changeover means 13.

Figure 4:
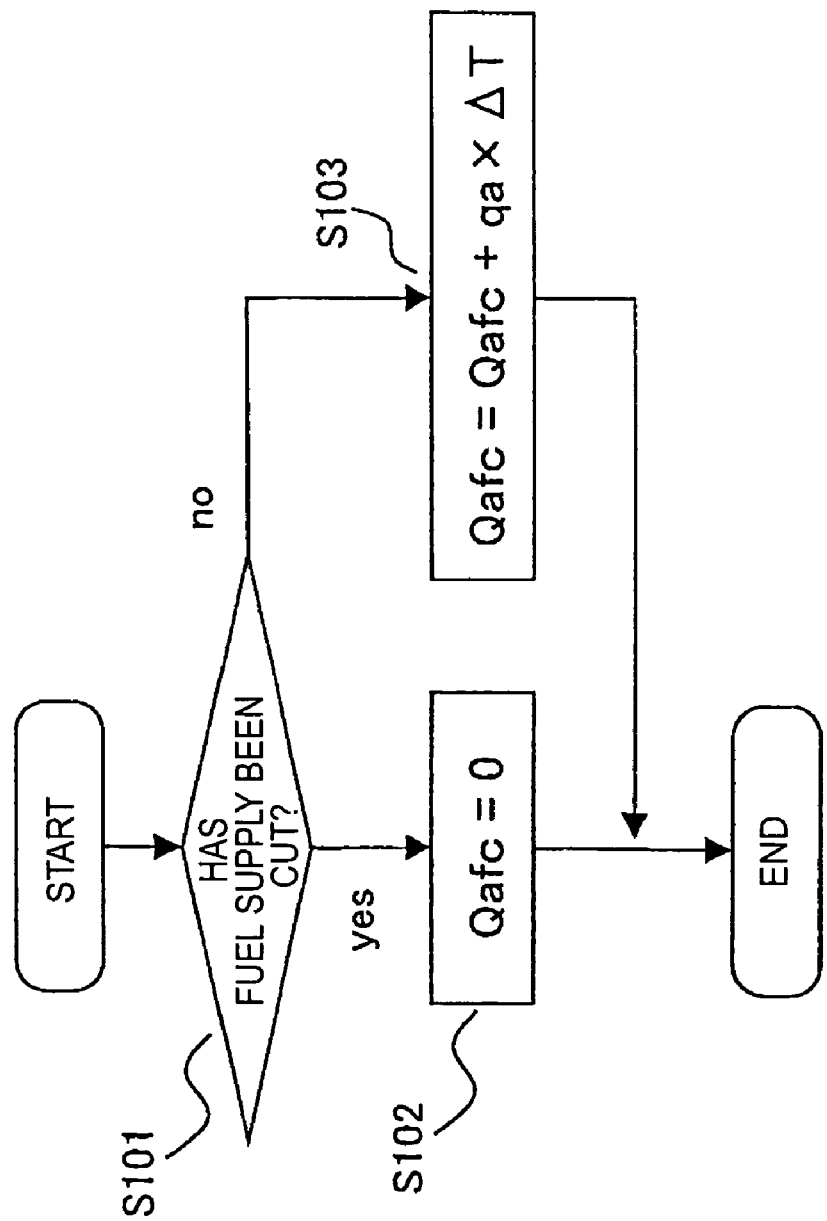
FIG. 4 is a flowchart showing content of control processing in proportional gain changeover means.
Figure 5:
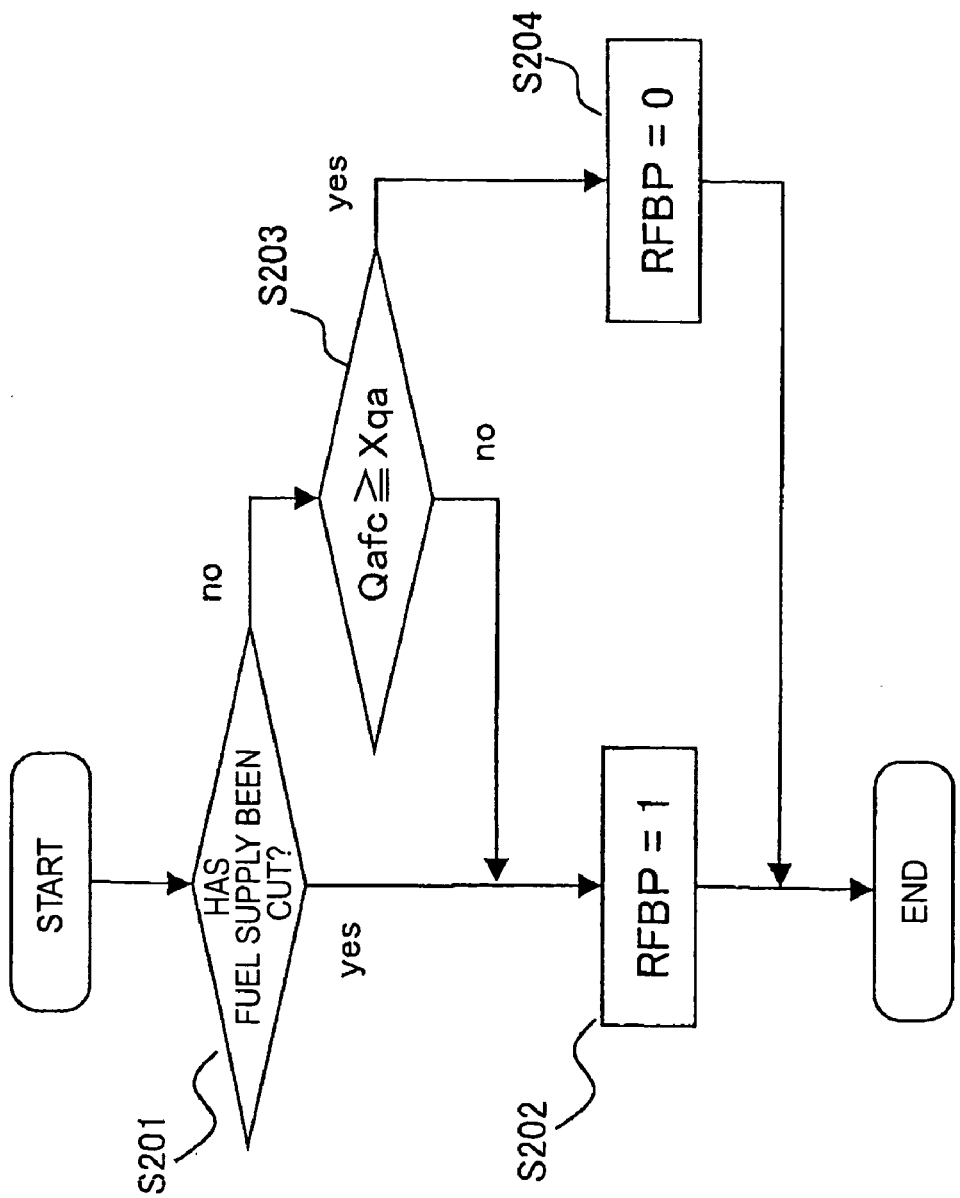
FIG. 5 is a flowchart showing the content of control processing in the proportional gain changeover means.

FIGS. 4 and 5 are flowcharts each showing the content of control processing in the proportional changeover means 13.

As shown in FIG. 4, the proportional gain changeover means 13 determines in step S101 whether or not the fuel cut means 11 has cut the fuel supply.

If the fuel supply has been cut, the flow of control proceeds to step S102 where the integrated air amount Qafc is reset to "0".

In contrast, if it is determined in step S101 that the fuel supply has not been cut, the flow of control proceeds to step S103 where the integrated air amount Qafc is increased by a value obtained by multiplying the intake air amount qa detected by the air amount sensor 14 and the calculation cycle ΔT by each other.

Even if the value detected by the air amount sensor 14 is not used, the intake air amount can be detected using information on the opening degree of the throttle valve 15, signal information from a pressure sensor (not shown) disposed within an intake pipe provided downstream of the throttle valve 15, and information on the rpm of the engine 1.

This configuration is designed to reset the integrated air amount to "0" during the fuel cut and integrate the amount of air from "0" upon recovery from the fuel cut, thus calculating a post-fuel-cut integrated air amount.

Next, the control processing shown in FIG. 5 will be described.

Referring to FIG. 5, the proportional gain changeover means 13 determines in step S201 whether or not the fuel cut means 11 has cut the fuel supply.

If it is determined that the fuel supply has been cut, the flow of control proceeds to step S202.

In step S202, a changeover flag RFBP is set to 1 so as to set the proportional gain Kpr of the downstream-side control means 9 to the post-fuel-cut gain.

In contrast, if it is determined in step S201 that the fuel supply has not been cut, the flow of control proceeds to step S203 where it is determined whether or not the post-fuel-cut integrated air amount Qafc is larger than a predetermined criterial air amount Xqa.

If it is determined in step S203 that the post-fuel-cut integrated air amount Qafc is not larger than the predetermined criterial air amount Xqa, the flow of control proceeds to step S202.

In step S202, the changeover flag RFBP is set to 1 so as to set the proportional gain to the post-fuel-cut gain.

In contrast, if it is determined in step S203 that the post-fuel-cut integrated air amount Qafc is larger than the predetermined criterial air amount Xqa, the flow of control proceeds to step S204.

In step S204, the changeover flag RFBP is set to "0" so as to set the proportional gain to the normal gain.

Information on the changeover flag RFBP is transmitted as information commanding a changeover in the proportional gain to the downstream-side control means 9.

The predetermined criterial air amount Xqa is set to a value of the integrated air amount that is calculated until the air-fuel ratio downstream of the catalytic converter 3 stabilizes in the neighborhood of the target air-fuel ratio after recovery from the fuel cut.

Overshoot or undershoot with respect to a target value, which is a common behavior in feedback control, may occur, for example, when the transportation of the exhaust gas from the engine 1 to the downstream-side oxygen concentration sensor is delayed for a certain period, when the response of the downstream-side oxygen concentration sensor is delayed for a certain period, or when the proportional gain is set to a certain value.

Thus, a changeover in the proportional gain may be made at a time when the air-fuel ratio has stopped overshooting or undershooting and almost stabilized in the neighborhood of the target value, or at a time when the air-fuel ratio has approached the target value while still overshooting or undershooting. For the sake of simplification, the following description deals with a case of a control apparatus free from overshoot or undershoot.

The predetermined criterial air amount Xqa can be experimentally set as follows.

The fuel cut is performed so that the oxygen storage amount of the catalytic converter 3 is changed to its upper limit. After recovery from the fuel cut, the integrated air amount before the air-fuel ratio downstream of the catalytic converter 3 is stabilized in the neighborhood of the target value is calculated through proportional calculation of the downstream-side control means and defined as a set value. At this moment, the proportional gain is set to the post-fuel-cut gain. The set value may be increased or decreased in advance in consideration of fluctuations resulting from driving conditions or the like.

In response to an output of a command from the proportional gain changeover means 13 to make a changeover in the proportional gain, the proportional gain Kpr of the downstream-side control means 9 is changed over to a post-fuel-cut gain Kpr_fc or a normal gain Kpr_nr.

The normal gain Kpr_nr is set as the proportional gain when the changeover flag RFBP is "0" indicating a changeover to the normal gain.

In contrast, the post-fuel-cut gain Kpr_fc is set as the proportional gain when the changeover flag RFBP is "1" indicating a changeover to the post-fuel-cut gain.

The post-fuel-cut gain Kpr_fc is set larger than the normal gain Kpr_nr so as to ensure a sufficiently high speed of recovery from a post-fuel-cut saturated oxygen storage amount to a suitable amount.

The normal gain is set sufficiently small so that the amplitude of torque fluctuations does not increase owing to overcorrection of the upstream-side target air-fuel ratio when the air-fuel ratio output from the downstream oxygen concentration sensor has changed.

The magnitude of the gain mentioned in the present invention is that of the absolute value of the set gain when a negative value is set as the proportional gain for reasons of sensor characteristics or arithmetic expressions.

Now, the effect achieved by the control apparatus for an internal combustion engine according to the first embodiment of the present invention will be described.

Figure 6:
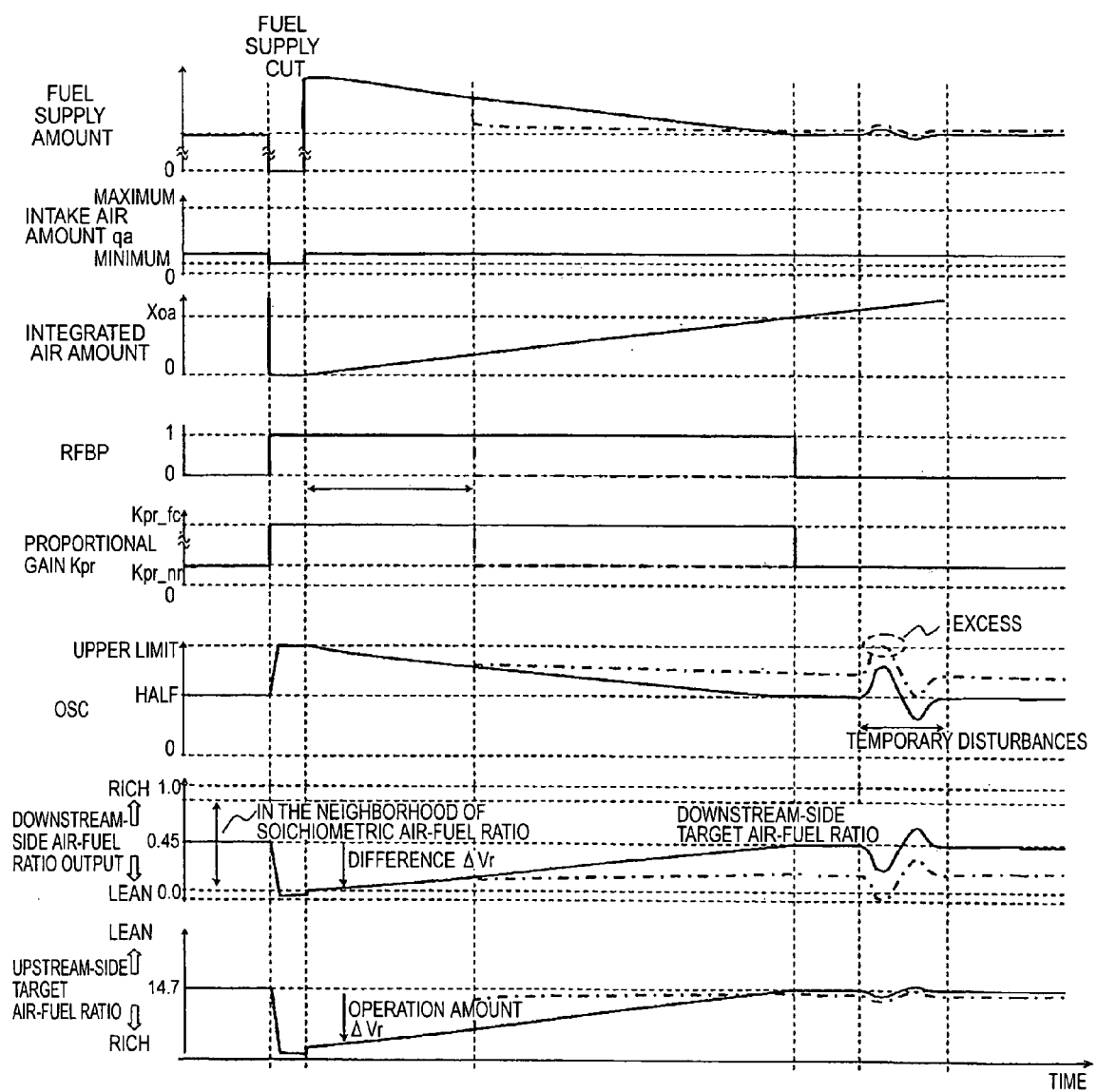
FIG. 6 is a time chart representing an air-fuel ratio control operation of the control apparatus for an internal combustion engine according to the first embodiment of the present invention.
Figure 7:
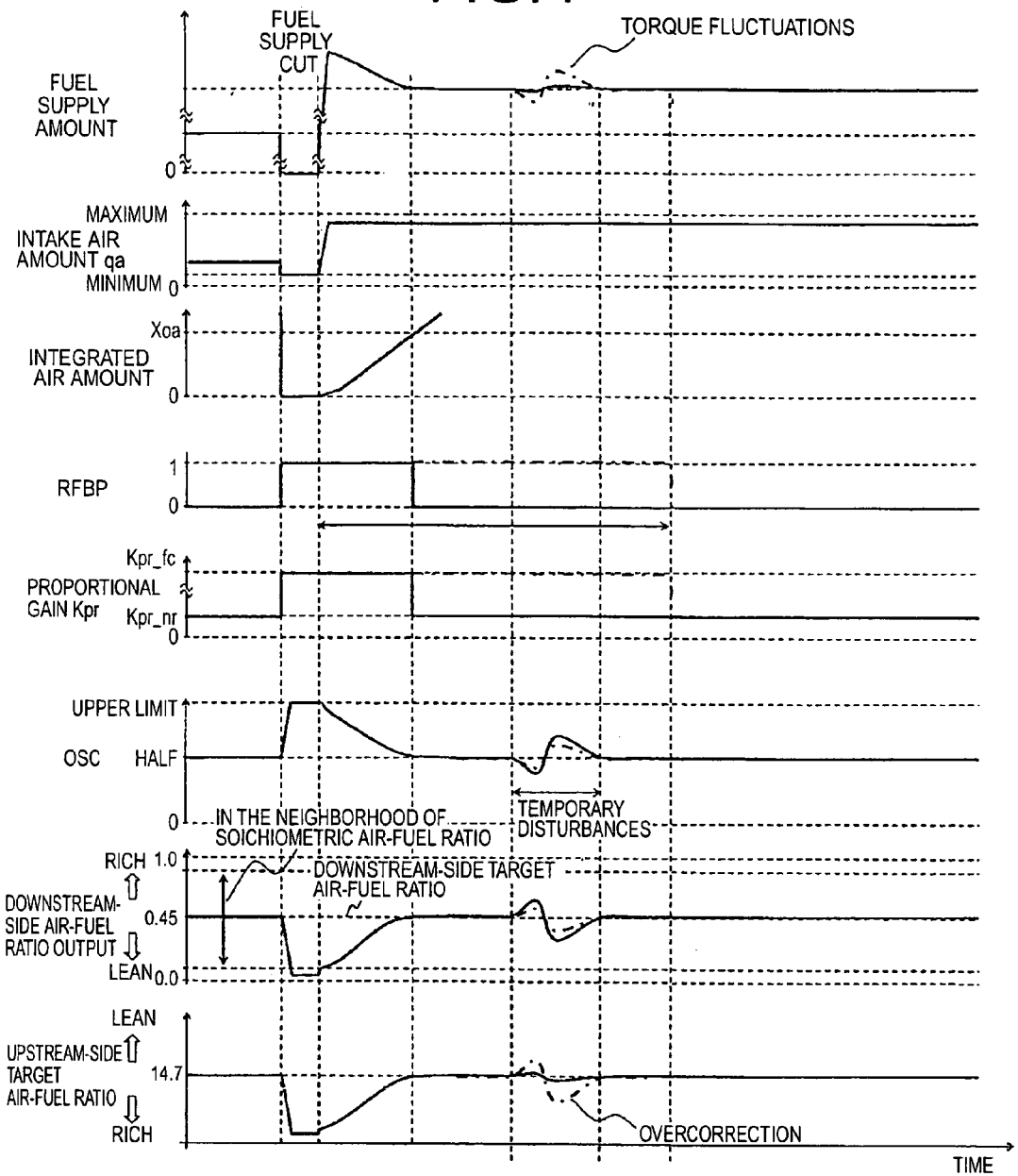
FIG. 7 is a time chart representing the air-fuel ratio control operation of the control apparatus for an internal combustion engine according to the first embodiment of the present invention.

FIGS. 6 and 7 are time charts each representing the operation of air-fuel ratio control performed by the control apparatus for an internal combustion engine according to the first embodiment of the present invention.

Referring to FIGS. 6 and 7 sequentially from above, solid lines indicate how the fuel supply amount, the intake air amount qa, the integrated air amount Qafc, the changeover flag (RFBP), the proportional gain Kpr, the oxygen storage amount (OSC), the downstream-side air-fuel ratio output, and the upstream-side target air-fuel ratio change before and after the fuel cut, respectively.

FIG. 6 shows the operation in the case where the intake air amount qa before and after the fuel cut is relatively small. FIG. 7 shows the operation in the case where the intake air amount qa is larger after the fuel cut than before the fuel cut.

Characteristics indicated by dot and dash lines show how the respective values change in the case (hereinafter referred to as "a comparative example" as well) where a changeover in the proportional gain is made after the lapse of a predetermined period (T0) since the fuel cut disregarding the behavior of the oxygen storage amount.

First, the changes in the respective values (indicated by dot and dash lines) in the comparative example shown in FIG. 6 will be described.

The post-fuel-cut gain Kpr_fc is set as the proportional gain Kpr until the predetermined period T0 set in advance elapses (from a time t2 to a time t3) after the fuel supply amount has temporarily become "0" (at a time t1) due to the fuel cut and a recovery from the state of fuel cut has been made (at the time t2). As soon as the predetermined period T0 elapses at the time t3, the proportional gain Kpr is changed over to a smaller gain, namely, the normal gain Kpr_nr.

The upstream-side target air-fuel ratio is set according to the equation (2), more specifically, by multiplying the difference ΔVr of the downstream-side air-fuel ratio output from the target value by the proportional gain Kpr, and increases or decreases in proportion to the difference ΔVr.

Since the integrally calculated value changes relatively slowly, its change amount within the above-mentioned period is small and therefore not indicated.

Since the large post-fuel-cut gain Kpr_fc is set as the proportional gain Kpr from the time t1 to the time t3, the operation amount in the upstream-side target air-fuel ratio, namely, the difference ΔA/F from the stoichiometric air-fuel ratio in the equation (8) indicating the behavior of the oxygen storage amount is large. Thus, the oxygen storage amount (OSC) recovers quickly.

However, the oxygen storage amount (OSC) has not recovered to a suitable amount, that is, to about half of its upper limit at the time 3 for making a changeover in the proportional gain. The proportional gain Kpr is changed over to the small normal gain Kpr_nr, and the operation amount ΔA/F in the upstream-side target air-fuel ratio for making a recovery of the oxygen storage amount decreases. As a result, the recovery of the oxygen storage amount is retarded significantly.

Next, the operation indicated by the solid lines in FIG. 6 will be described.

In the control apparatus for an internal combustion engine according to the first embodiment of the present invention, as indicated by the solid lines in FIG. 6, the post-fuel-cut gain Kpr_nr is set as the proportional gain Kpr (from the time t2 to a time t4) until the integrated air amount Qafc that has recovered from the state of fuel cut at the time t2 reaches the predetermined criterial air amount Xqa.

At the time t4, the oxygen storage amount has recovered to a suitable amount, that is, half of its upper limit, and the downstream-side air-fuel ratio output value becomes equal to a downstream-side target air-fuel ratio corresponding to the stoichiometric air-fuel ratio.

Thus, no obstacle is caused in recovery of the oxygen storage amount even when the proportional gain Kpr is changed over to the small normal gain Kpr_nr at the time t4.

There is indicated a case where a temporary disturbance is caused in the upstream-side air-fuel ratio output between a time ta and a time tb.

The disturbance is caused due to various factors, for example, changes in engine rpm resulting from a gearshift in a transmission, changes in the opening degree of a valve for recirculation of the exhaust gas into the intake pipe, changes in the opening degree of the throttle valve.

The upstream-side air-fuel ratio is feedback-controlled by the upstream-side control means while minutely fluctuating around the upstream-side target air-fuel ratio. In the event of a disturbance, however, the fluctuation amount of the air-fuel ratio increases, so the fluctuation amount of the oxygen storage amount increases as well.

In the case of the comparative example, the oxygen storage amount has not sufficiently recovered to half of a value corresponding to the highest disturbance absorbing capacity. Therefore, if a temporary disturbance is caused in the upstream-side air-fuel ratio, the oxygen storage amount reaches its upper limit. The atmosphere in the catalytic converter 3 thereby deviates from the neighborhood of the stoichiometric air-fuel ratio, thus causing a significant drop in an exhaust gas purification ratio.

In the case of the present invention indicated by the solid lines, on the other hand, the oxygen storage amount has recovered to half of the value corresponding to the highest disturbance absorbing capacity. Therefore, in the event of a disturbance, the oxygen storage amount can be confined to a range between "0" and its upper limit. Accordingly, the atmosphere in the catalytic converter 3 can be maintained in the neighborhood of the stoichiometric air-fuel ratio, so the purification ratio can be prevented from decreasing.

Next, a description will be given as to a case where the intake air amount qa is larger after the fuel cut than before the fuel cut as shown in FIG. 7.

In the comparative example (indicated by dot and dash lines), the post-fuel-cut gain Kpr_fc is set as the proportional gain Kpr until the predetermined period T0 set in advance elapses (from a time t12 to a time t14) after the fuel supply amount has temporarily become equal to "0" due to the fuel cut (at a time t11) and a recovery from the state of fuel cut has been made at the time t12.

After the lapse of the predetermined period T0 at the time t14, the proportional gain Kpr is changed over to the smaller gain, that is, the normal gain Kpr_nr.

The intake air amount qa after the recovery from fuel cut has significantly increased in comparison with the case of FIG. 6, and the recovery of the oxygen storage amount (OSC) has been drastically accelerated.

Thus, unlike the case of FIG. 6, the oxygen storage amount (OSC) has recovered to the suitable amount, that is, about half of its upper limit at a time t13 which is before the lapse of the predetermined period T0. After this recovery, the proportional gain Kpr remains set to the large post-fuel-cut gain Kpr_fc for a long period from the time t13 to the time t14.

On the other hand, in the control apparatus for an internal combustion engine according to the first embodiment of the present invention, as indicated by the solid lines in FIG. 7, the integrated air amount Qafc reaches the predetermined criterial air amount Xqa within a shorter period due to an increase in the intake air amount, so the post-fuel-cut gain Kpr_fc remains set as the proportional gain Kpr for a shorter period (from the time t11 to the time t13). The oxygen storage amount has recovered to the suitable amount, that is, half of its upper limit at the time t13, so a changeover to the normal gain Kpr_nr causes no obstacle.

An adaptation to the acceleration of recovery of the oxygen storage amount resulting from an increase in the intake air amount qa is made, and the time for a changeover in the gain is advanced.

The following description shows a case where a temporary disturbance is, as in the case of FIG. 6, caused in the upstream-side air-fuel ratio from a time t1$a$ to a time t1$b$.

In the case of the comparative example, the large post-fuel-cut gain Kpr_fc is set as the proportional gain. In this case, the upstream-side target air-fuel ratio fluctuates greatly due to fluctuations in the downstream-side air-fuel ratio output, so the fuel supply amount supplied to the engine fluctuates greatly. Therefore, this leads to great fluctuations in engine torque and deterioration in the marketability of the engine designed for stable power supply.

In the case of the present invention, on the other hand, the small normal gain Kpr_nr is set as the proportional gain, so fluctuations in the downstream-side air-fuel ratio output cause only minor fluctuations in the upstream-side target air-fuel ratio and in the fuel supply amount. Consequently, torque fluctuations can be restricted to a permissible level.

In both the comparative example and the present invention, the oxygen storage amount has recovered to half of its upper limit, so the exhaust gas purification ratio can be prevented from dropping even in the event of a disturbance.

Next, the advantageous effect of the control apparatus for an internal combustion engine according to the first embodiment of the present invention will be described.

As shown in FIGS. 6 and 7, the time when the oxygen storage amount recovers to half of its upper limit coincides with the time when the integrated air amount Qafc reaches the predetermined criterial air amount Xqa, but at the same time, also with the time when the downstream-side air-fuel ratio output reaches the downstream-side target air-fuel ratio.

It is therefore conceivable to make a changeover in the proportional gain as soon as the downstream-side air-fuel ratio output coincides with the downstream-side target air-fuel ratio. However, a changeover in the integrated air amount is preferred because there is a fear of erroneous determination in the following two cases where: 1) fluctuations occur in the output from the upstream-side oxygen concentration sensor, and 2) the control apparatus has such characteristics that the downstream-side air-fuel ratio output overshoots or undershoots with respect to the target value.

Figure 8:
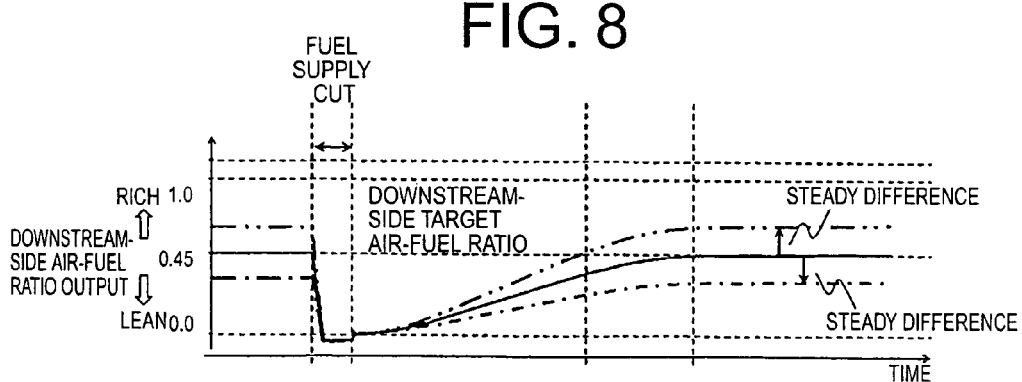
FIG. 8 is a diagram showing a behavior of a downstream-side air-fuel ratio output before and after the fuel cut in the case where the output of the upstream-side oxygen concentration sensor has fluctuated.

FIG. 8 is a diagram showing a behavior of the downstream-side air-fuel ratio output before and after the fuel cut in the case where the output of the upstream-side oxygen concentration sensor has fluctuated.

A solid line in FIG. 8, which corresponds to the case of FIGS. 6 and 7, indicates the behavior of the downstream-side air-fuel ratio output before and after the fuel cut in the case where no fluctuations in output are caused.

Figure 9:
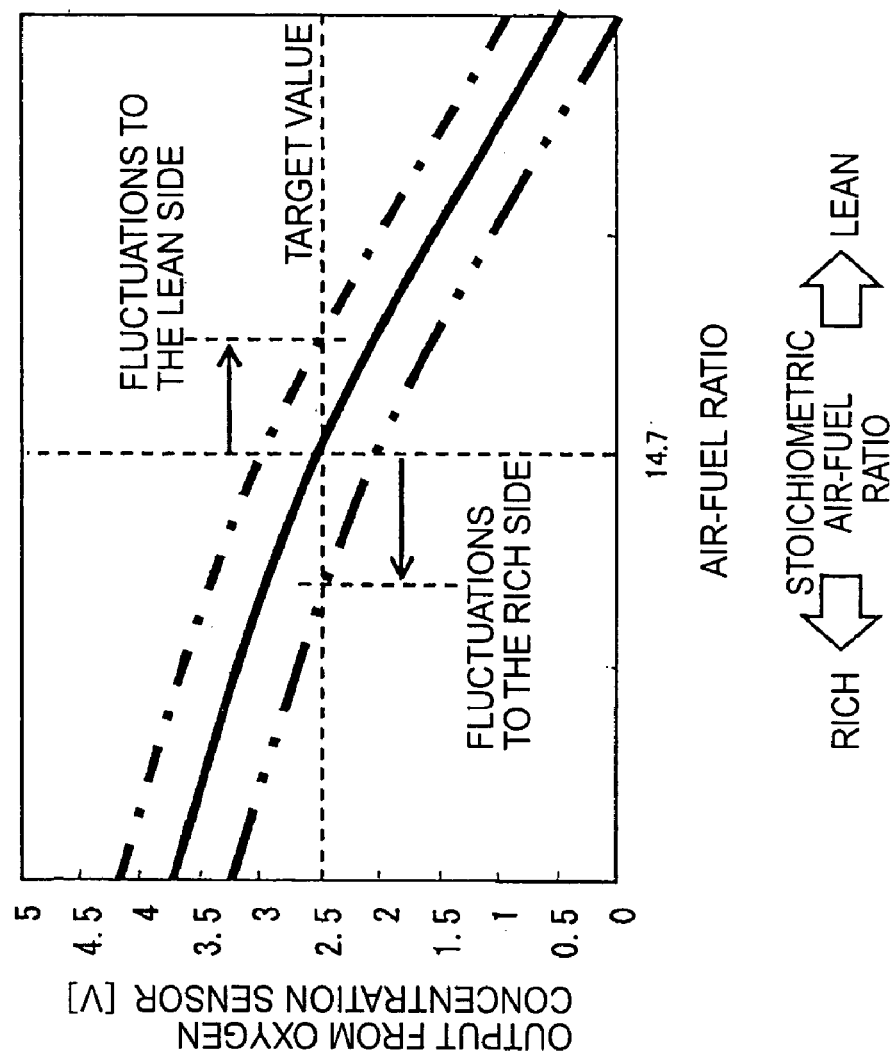
FIG. 9 is a diagram illustrating how characteristics of an air-fuel ratio for the output from the oxygen concentration sensor changes when the air-fuel ratio fluctuates to the rich side or to the lean side.

FIG. 9 is a diagram illustrating how characteristics of the air-fuel ratio for the output from the oxygen concentration sensor changes when the air-fuel ratio fluctuates to the rich side or to the lean side.

As is apparent from FIG. 9, given that the air-fuel ratio is controlled to the same target value, a double dotted-dashed line indicates a case where such fluctuations are caused when the air-fuel ratio shifts to the rich side, whereas a double dotted-dashed line indicates a case where such fluctuations are caused that the air-fuel ratio shifts to the lean side.

In each case where fluctuations in the air-fuel ratio output are caused, in comparison with the case where no fluctuations in the air-fuel ratio output are caused, a steady difference is created after a time (t24) when the air-fuel ratio coincides with the target value. The double dotted-dashed line indicates a steady difference on the rich side where the air-fuel ratio is larger than the target value. The double dotted-dashed line indicates a steady difference on the lean side where the air-fuel ratio is smaller than the target value.

If a method of making a changeover in the proportional gain according to the downstream-side air-fuel ratio output is adopted, the changeover is made at the time t24 in the case where no fluctuations in air-fuel ratio output are caused as indicated by the solid line. However, the changeover is made at a time t23 that is earlier than the time t24 in the case where fluctuations to the rich side are caused as indicated by the double dotted-dashed line. No changeover in the proportional gain is made in the case where fluctuations to the lean side are caused as indicated by the double dotted-dashed line, because the air-fuel ratio does not reach the target value. While the fluctuations in air-fuel ratio output are eliminated through integral calculation of the downstream-side control means in the long run, a similar behavior lasts for a while after the fluctuations in air-fuel ratio output.

If the method of making a changeover in the proportional gain according to the downstream-side air-fuel ratio output is thus adopted, the time for making the changeover is subject to an error due to fluctuations in the output from the upstream-side oxygen concentration sensor. If the fluctuations occur in a certain direction, there is a fear in that the changeover in the proportional gain is not made. In the present invention, on the other hand, the changeover is made at the time t24 regardless of fluctuations, so stable operation can be realized.

Figure 10:
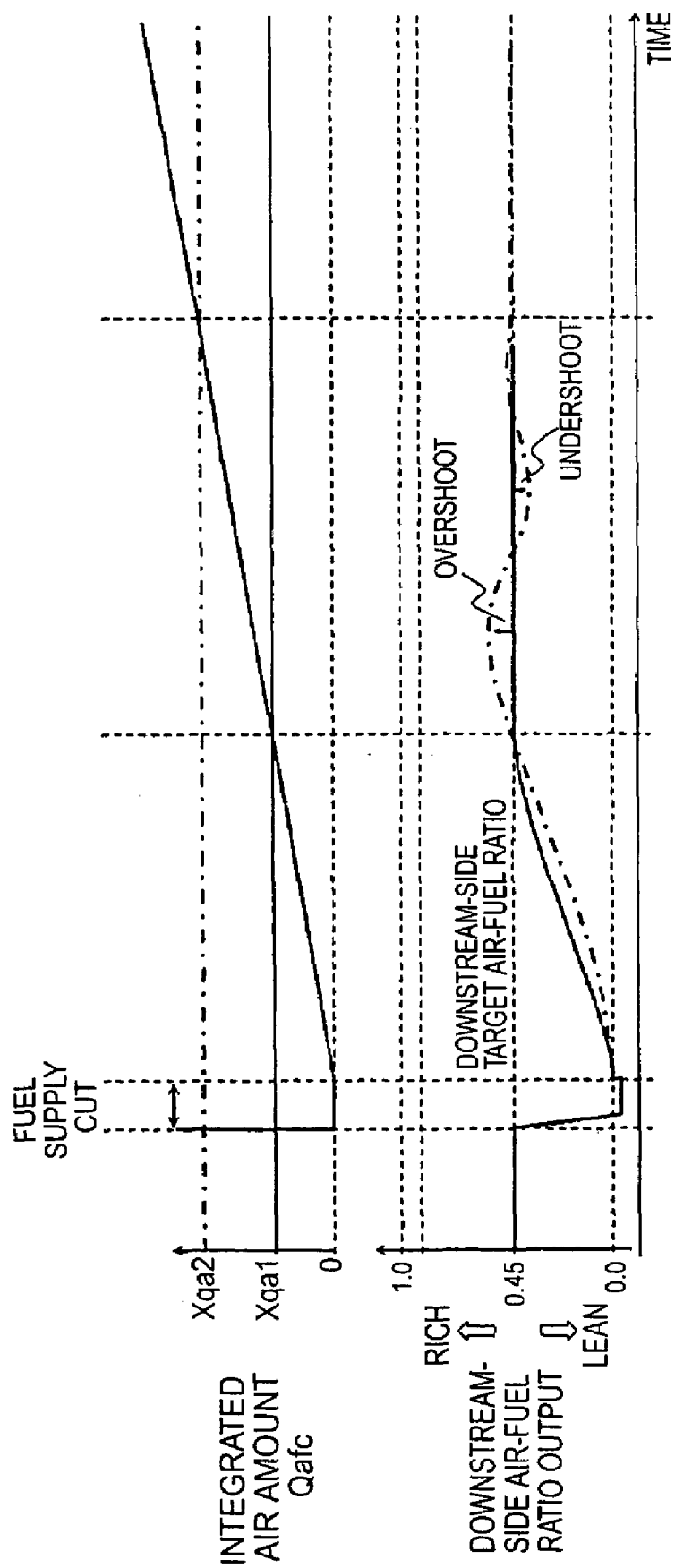
FIG. 10 is a diagram showing a behavior of a downstream-side air-fuel ratio output before and after the fuel cut in the case of a control apparatus in which, the downstream-side air-fuel ratio output overshoots or undershoots with respect to a target value.

FIG. 10 is a diagram showing a behavior of the downstream-side air-fuel ratio output before and after the fuel cut in the case of a control apparatus having such characteristics that the downstream-side air-fuel ratio output overshoots or undershoots with respect to a target value due to the above-mentioned factor.

Solid lines in FIG. 10, which correspond to the cases of FIGS. 6 and 7, indicates the behavior of the downstream-side air-fuel ratio output before and after the fuel cut in the case where the air-fuel ratio does not overshoot or undershoot. Chain double-dashed lines in FIG. 10 indicate the case of a control apparatus having such characteristics that the air-fuel ratio overshoots or undershoots, respectively.

If the method of making a changeover according to the downstream-side air-fuel ratio output is adopted, the time of determination is the time t33 which is a suitable time in the case of the apparatus having such characteristics that the air-fuel ratio does not overshoot or undershoot (as indicated by the solid line), whereas the time of determination is the time t34, which is prior to the time t33, as a suitable time when the air-fuel ratio output stabilizes in the neighborhood of the target value in the case of the apparatus having such characteristics that the air-fuel ratio overshoots or undershoots (as indicated by the dot and dash line).

On the other hand, if the method based on the integral air amount according to the present invention is adopted, the predetermined criterial air amount Xqa can be set to a value taking overshoot or undershoot into account, using the aforementioned experimental method. The predetermined criterial air amount Xqa is set to Xqa1 of FIG. 10 in the case of a control apparatus exhibiting a transient response free from overshoot or undershoot. On the other hand, the predetermined criterial air amount Xqa is set to Xqa2 of FIG. 10 in the case of a control apparatus subject to overshoot or undershoot, so the time for making the changeover can be so set in advance as to suit the transient response of the control apparatus.

Therefore, according to the present invention, the changeover between the normal proportional gain and the post-fuel-cut proportional gain that is set larger than the normal proportional gain is made based on the post-fuel-cut integrated air amount that is proportional to the recovery behavior of the storage amount of oxygen saturated due to the fuel cut. This makes it possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

Although the control apparatus for an internal combustion engine according to the first embodiment of the present invention has been described, the present invention is not limited to the contents of the foregoing description.

Second Embodiment

In the first embodiment, in order to ensure coincidence between the air-fuel ratio upstream of the catalytic converter 3 and the upstream-side target air-fuel ratio, the fuel supply amount is operated in a feedback manner by transmitting the upstream-side air-fuel ratio output detected by the upstream oxygen concentration sensor 4 to the upstream-side control means 8. The control of the fuel supply amount is not limited to this method.

That is, with the control apparatus for an internal combustion engine according to the second embodiment of the present invention, quick recovery of the storage amount of saturated oxygen is required, while, for example, the proportional gain has been set to the post-fuel-cut gain, so the fuel supply amount may be operated in a feedforward manner based on the upstream-side target air-fuel ratio by the air-fuel ratio adjusting means 7 without using the upstream-side air-fuel ratio output or the upstream-side control means 8.

This method allows the air-fuel ratio to be operated with a good response. Therefore, as is the case with the first embodiment, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

Note that the air-fuel ratio adjusting means 7 is configured as follows when the fuel supply amount is controlled as described above.

The fuel supply amount Qfuel is calculated as expressed by the following equation (10) when the proportional gain changeover means 13 determines that the proportional gain should be set to the post-fuel-cut gain (RFBP=1).

$$Q\text{fuel0} = Q\text{acyl/upstream-side target air-fuel ratio} \quad (10)$$

In contrast, the fuel supply amount Qfuel is calculated in the same manner as expressed by the equations (5) to (7) of the aforementioned embodiment when the proportional gain changeover means 13 determines that the proportional gain should be set to the normal gain (RFBP=0).

Third Embodiment

Figure 11:
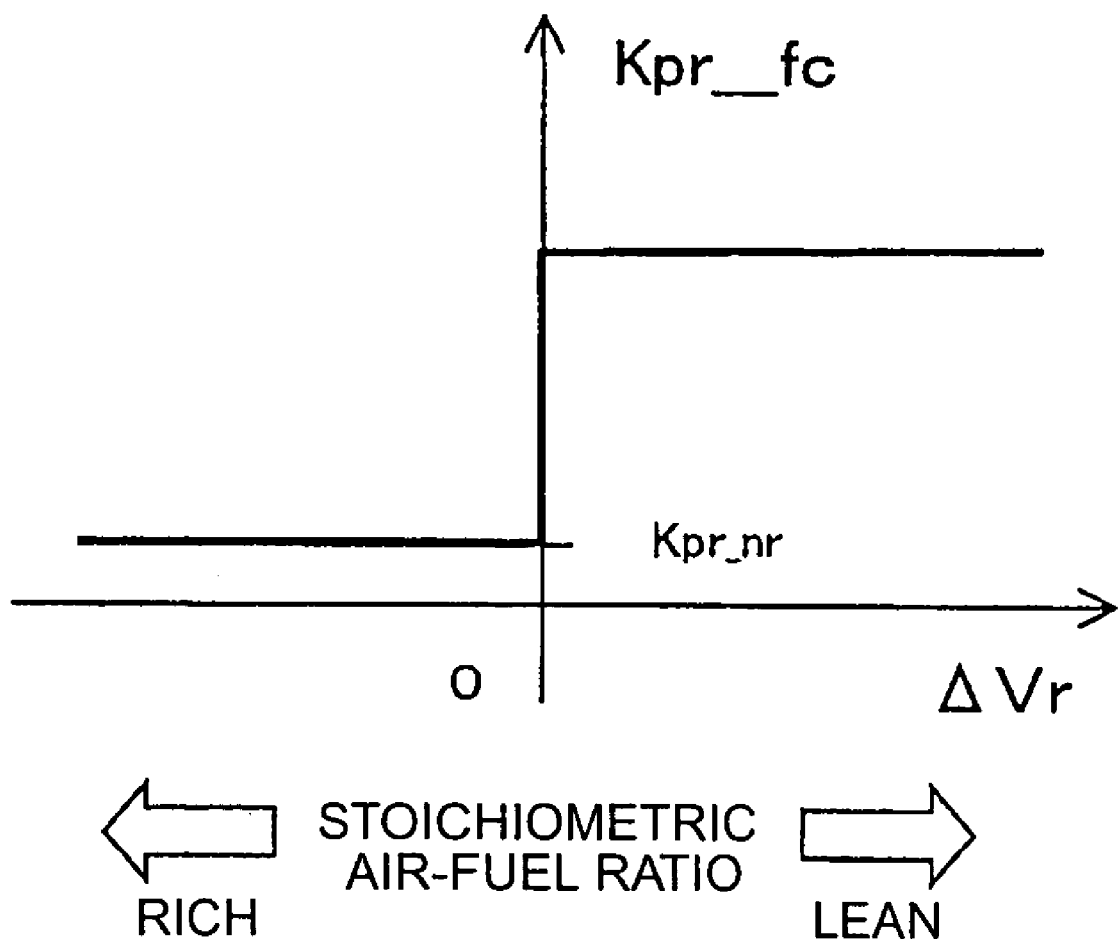
FIG. 11 is a diagram showing characteristics of a proportional gain with respect to the stoichiometric air-fuel ratio in a control apparatus for an internal combustion engine according to a third embodiment of the present invention.

FIG. 11 is a diagram showing characteristics of the proportional gain with respect to the stoichiometric air-fuel ratio in a control apparatus for an internal combustion engine according to a third embodiment of the present invention.

Although the post-fuel-cut proportional gain Kpr_fc is set constant in the second embodiment, the control of the fuel supply amount is not limited to this method.

That is, in the control apparatus for an internal combustion engine according to the third embodiment of the present invention, the post-fuel-cut proportional gain Kpr_fc may be set larger than the normal gain Kpr_nr on the lean side with respect to the downstream-side target air-fuel ratio (in a region where the difference $\Delta$Vr between the downstream-side target air-fuel ratio and the downstream-side air-fuel ratio output in the equation (1) is positive) as shown in, for example, FIG. 11.

Owing to such control, the operation amount required for recovery of the saturated oxygen storage amount after the fuel cut remains unchanged. Therefore, as is the case with the first embodiment, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

Fourth Embodiment

Figure 12:
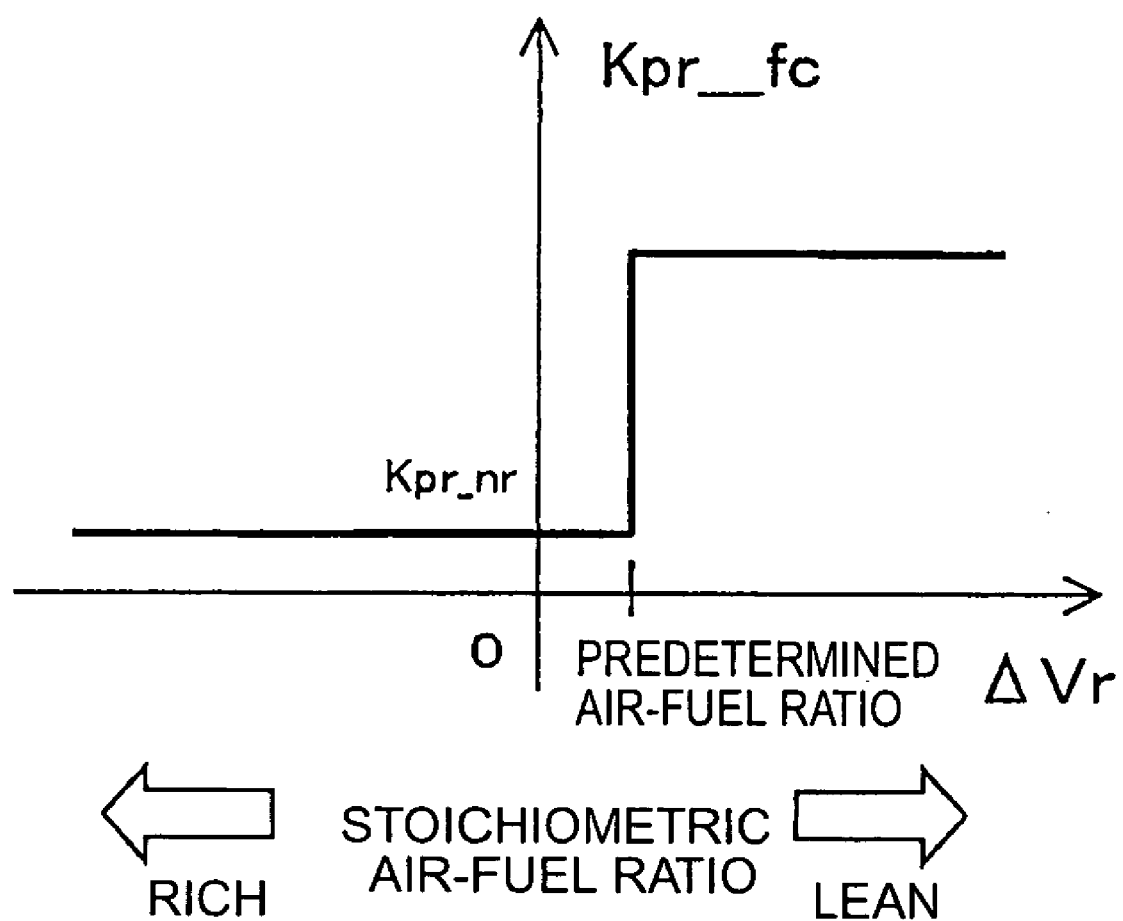
FIG. 12 is a diagram showing characteristics of a proportional gain with respect to the stoichiometric air-fuel ratio in a control apparatus for an internal combustion engine according to a fourth embodiment of the present invention.

FIG. 12 is a diagram showing the characteristic of a proportional gain with respect to the stoichiometric air-fuel ratio in a control apparatus for-an internal combustion engine according to a fourth embodiment of the present invention.

Although the post-fuel-cut gain Kpr_fc is set constant in the first embodiment, the control of the fuel supply amount is not limited to this method.

That is, in the control apparatus for an internal combustion engine according to the fourth embodiment of the present invention, the post-fuel-cut gain Kpr_fc may be set larger than the normal gain Kpr_nr by a predetermined value on the lean side with respect to the predetermined air-fuel ratio as shown in, for example, FIG. 12.

Owing to such control, the recovery of the saturated oxygen storage amount after the fuel cut can be accelerated. Therefore, as is the case with the first embodiment, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

Fifth Embodiment

Although the fourth embodiment handles a case where the predetermined criterial air amount Xqa to be compared with the integrated air amount Qafc remains unchanged over time, the control of the fuel supply amount is not limited to this method.

That is, in the control apparatus for an internal combustion engine according to a fifth embodiment of the present invention, the predetermined criterial air amount Xqa may be so set as to decrease in accordance with an increase in degradation degree of the catalytic. The degradation degree of the catalytic is calculated by, for example, catalytic degradation degree calculating means (not shown) for detecting a decrease in the upper limit of the oxygen storage amount resulting from degradation with time of a substance that is added to the catalytic converter 3 to produce an oxygen storage effect. This catalytic degradation degree calculating means stores and retains in advance characteristics of degradation with time of the substance that is added to the catalytic converter 3 to produce an oxygen storage effect, and calculates a catalytic degradation degree according to the elapsed time from the start of use.

Owing to such control, the time for making a changeover in the proportional gain can be conformed to the degradation degree of the catalytic converter 3. Therefore, as is the case with the first embodiment, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation. 41.

The foregoing description has dealt with the control apparatus for an internal combustion engine employing as the downstream oxygen concentration sensor 5 a λ-type oxygen concentration sensor outputting a binary value for a change in the air-fuel ratio shown in the aforementioned FIG. 2. However, even if a linear-type oxygen concentration sensor outputting a linear value for a change in the air-fuel ratio shown in the aforementioned FIG. 3 is employed as the downstream oxygen concentration sensor 5, it is possible to detect changes in the neighborhood of the stoichiometric air-fuel ratio. Therefore, as is the case with the aforementioned embodiments, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

Further, the foregoing description has dealt with the control apparatus for an internal combustion engine employing as the upstream oxygen concentration sensor 4 a linear-type oxygen concentration sensor outputting a linear value for a change in the air-fuel ratio shown in the aforementioned FIG. 3. However, even if λ-type oxygen concentration sensor outputting a binary value for a change in the air-fuel ratio shown in the aforementioned FIG. 2 is employed, it is possible to perform air-fuel ratio control. Therefore, as is the case with the aforementioned respective embodiments, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

In the case where this λ-type oxygen concentration sensor is employed, as disclosed in JP 63-195351 A, the upstream-side control means 8 may be adapted to change the control parameter of the upstream-side controller as indicated by 1) to 3) below such that the average value of the upstream-side air-fuel ratio can be operated in accordance with a command for the upstream-side target air-fuel ratio set by the downstream-side control means 9.

For instance, the average value of the air-fuel ratio upstream of the catalytic converter 3 is controlled to the rich side or to the lean side by individually changing set values, such as 1) a skip amount (corresponding to the proportional gain), 2) an integral gain, and 3) a delay time for a rich/lean determination, depending on whether the air-fuel ratio is operated to the rich side or to the lean side.

Owing to the mixing within the catalytic converter 3 and the exhaust pipe or the oxygen storage effect of the catalytic converter 3, the air-fuel ratio upstream of the catalytic converter 3 is averaged and transmitted to the side downstream of the catalytic converter 3. It is thus possible to adopt a configuration in which the average value of the air-fuel ratio upstream of the catalytic converter 3 is controlled. With this control as well, as is the case with the aforementioned respective embodiments, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

The aforementioned embodiments have dealt with the case where the PI controller for performing proportional calculation and integral calculation is used as the upstream-side control means 8. However, the air-fuel ratio upstream of the catalytic converter 3 can also be controlled through proportional calculation only, proportional calculation and differential calculation, or any combination of proportional calculation, integral calculation, and differential calculation. Therefore, as is the case with the aforementioned respective embodiments, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

Further, the aforementioned embodiments have dealt with the case where the PI controller for performing proportional calculation and integral calculation is used as the downstream-side control means 9. However, the air-fuel ratio downstream of the catalytic converter 3 can also be controlled through proportional calculation only, proportional calculation and differential calculation, or any combination of proportional calculation, integral calculation, and differential calculation. Therefore, as is the case with the aforementioned respective embodiments, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

Figure 13:
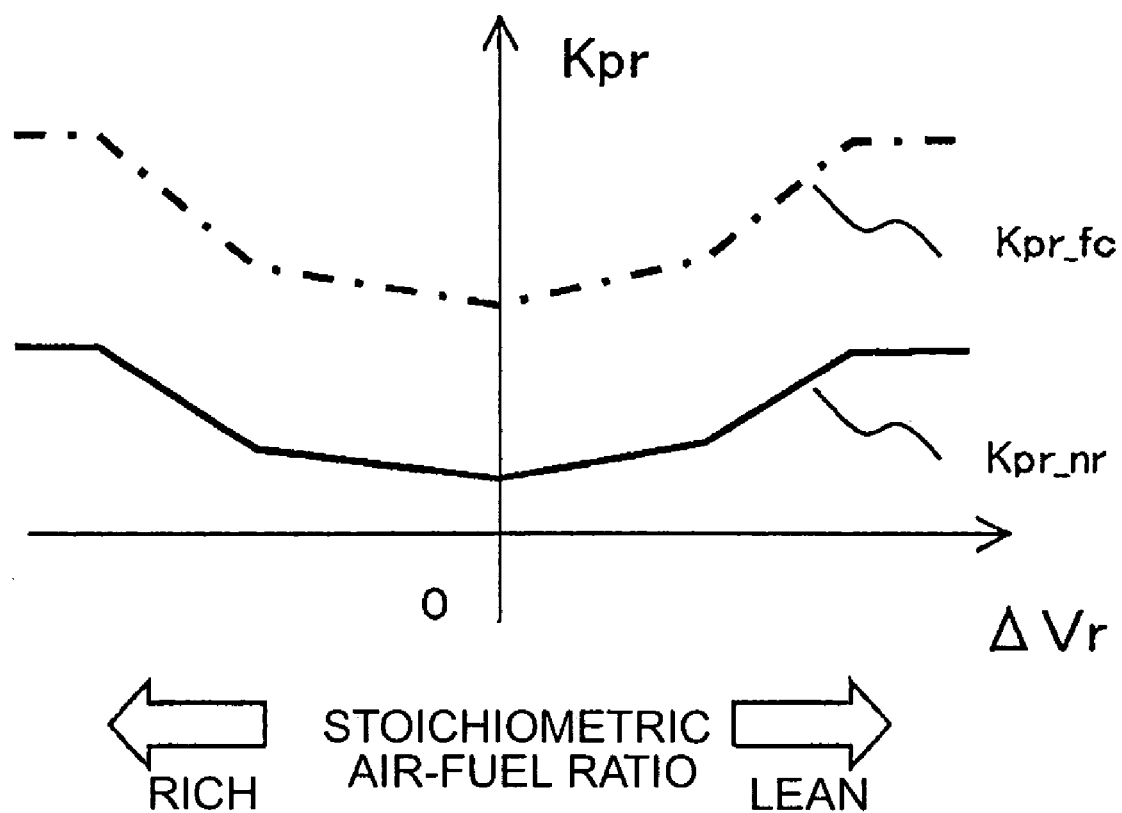
FIG. 13 is a diagram showing characteristics of a proportional gain of downstream-side control means.

In the aforementioned embodiments, the constant Kpr is used as the proportional gain for proportional calculation in the downstream-side control means 9. As shown in FIG. 13, however, the air-fuel ratio downstream of the catalytic converter 3 can also be controlled through a fairly common variable gain configuration in which the proportional gain Kpr is changed according to the operating point of the difference ΔVr between the downstream-side target air-fuel ratio and the downstream-side air-fuel ratio output. Therefore, as is the case with the aforementioned respective embodiments, it is possible to ensure quick recovery of the storage amount of oxygen saturated due to the fuel cut, restore the capacity of the catalytic converter 3 to absorb air-fuel ratio disturbances, and suppress torque fluctuations through prevention of overcorrection of the air-fuel ratio during normal operation.

What is claimed is:

1. A control apparatus for an internal combustion engine, comprising:
   an exhaust system of the internal combustion engine;
   a catalytic converter disposed in the exhaust system, for purifying an exhaust gas;
   upstream-side air-fuel ratio detecting means for detecting an air-fuel ratio upstream of the catalytic converter;
   downstream-side air-fuel ratio detecting means for detecting an air-fuel ratio in the exhaust gas downstream of the catalytic converter;

air-fuel ratio adjusting means for adjusting the air-fuel ratio through adjustment of an amount of fuel supplied to the internal combustion engine;

downstream-side target air-fuel ratio storing means for storing and retaining a target value for the air-fuel ratio downstream of the catalytic converter;

downstream-side control means for calculating an upstream-side target air-fuel ratio through proportional calculation so that the downstream-side air-fuel ratio detected by the downstream-side air-fuel ratio detecting means coincides with the downstream-side target air-fuel ratio stored and retained by the downstream-side target air-fuel ratio storing means;

upstream-side control means for controlling the air-fuel ratio adjusting means so that the upstream-side air-fuel ratio detected by the upstream-side air-fuel ratio detecting means coincides with the upstream-side target air-fuel ratio calculated by the downstream-side control means;

fuel supply cut means for cutting the fuel supply performed by means of the air-fuel ratio adjusting means; and proportional gain changeover means for making a changeover in a proportional gain for proportional calculation in the downstream-side control means for a predetermined period from a normal proportional gain to a post-fuel-cut proportional gain set larger than the normal proportional gain by a predetermined value, when the fuel cutoff means starts cutting the fuel supply.

2. A control apparatus for an internal combustion engine according to claim 1, wherein:

the air-fuel ratio adjusting means adjusts the fuel supply amount based on the upstream-side target air-fuel ratio calculated by the downstream-side control means while the proportional gain changeover means maintains the proportional gain at the post-fuel-cut proportional gain.

3. A control apparatus for an internal combustion engine according to claim 1, further comprising:

an air amount detecting sensor for detecting an intake air amount, wherein:

the proportional gain changeover means calculates an integrated value of an amount of air sucked into the internal combustion engine, and makes a changeover in the proportional gain of the downstream-side control means from the post-fuel-cut proportional gain to the normal proportional gain when the integrated value of the amount of air sucked into the internal combustion engine reaches a predetermined criterial air amount after the fuel cutoff means has stopped cutting the fuel supply.

4. A control apparatus for an internal combustion engine according to claim 3, further comprising:

catalytic degradation degree calculating means for calculating a degree of degradation of the catalytic converter, wherein:

the integrated value of the amount of air sucked into the internal combustion engine is reduced by a predetermined value in accordance with the degradation degree of the catalytic converter calculated by the catalytic degradation degree calculating means.

5. A control apparatus for an internal combustion engine according to claim 1, wherein:

the post-fuel-cut proportional gain is set larger than the normal proportional gain by a predetermined value on a lean side with respect to a predetermined air-fuel ratio.

6. A control apparatus for an internal combustion engine according to claim 5, wherein:

the predetermined air-fuel ratio is the downstream-side target air-fuel ratio.

* * * * *